INVENTOR.
YOSHIO HAYASHI
BY KIMITAKA SAWANO

Scrivener Parker Scrivener + Clarke
ATTORNEYS 3,621,844
METHOD AND APPARATUS FOR INDICATING THE CONDITION OF A WOMAN AND UNBORN CHILD DURING CHILDBIRTH Yoshio Hayashi and Kimitaka Sawano, Sapporo-shi, Japan, assignors to Daiichi Yakuhin Sangyo Kabushiki Kaisha, Tokyo-to, Japan
Filed Mar. 4, 1969, Ser. No. 804,125
Claims priority, application Japan, Apr. 2, 1968, 43/21,580
Int. Cl. A61b 5/02
U.S. Cl. 128—2.05 R
7 Claims

ABSTRACT OF THE DISCLOSURE

The method and apparatus for indicating the condition of pregnant women and unborn children during each successive stage of parturition includes converting a fetal heart tone and heart beat into electric signals having a frequency and amplitude indicative thereof and sensing the electric potential of the signals to determine whether the potential is above or below a desired level. A filter unit is employed to eliminate noise signals occurring at the onset of labor pains from the signal from which the potential level is sensed, and these noise signals are fed to a second filter means to operate a labor pain indicator. When the electric potential of the sensed signal is below a desired level, the signal is employed to operate a normal condition indicator which includes both visual and audio indication means, while signals above a desired potential level are employed to operate an abnormal visual condition indicator as well as the audio indication means.

DETAILED EXPLANATION OF THE INVENTION

This invention relates to a method and apparatus for watching the development of childbirth which indicates the condition of a pregnant woman and her unborn child through lamps and sounds by converting periodic information coming from the fetus such as ECG, heart tone and heart beat into electric signals observation is made in three aspects of parturition: the physiological development, the dangerous (abnormal) condition, if any, and the onset of labor pains.

Generally, fetal heart tone is clinically used as a signal that indicates the degree of safety in the development of parturition, and the fetal heart beats 120 to 160 times per minute under normal conditions. With the onset of fits of labor pains, the blood circulation to the fetus is reduced, resulting in the decline of the frequency of heart of the fetus, and with the wane of labor pains, the frequency of the fetal heart beat recovers the original value. In case, however, the environmental condition of the fetus deteriorates, or the fetus is falling into the state of asphyxia or death, the frequency of the heart beat keeps on rising or declining. The conventional method of watching the parturition made use of this phenomenon by directly auscultating the fetal heart tone by means of a traube stethoscope, by obtaining a fetal electrocardiogram by means of a fetal ECG, or by identifying the frequency of the fetal heart tone by means of a fetal heart tone magnifying device.

However, in performing the direct auscultation, the parturition watcher has to personally keep watch on the shift of the fetal heart tone incessantly and continuously for a long time in order to obtain a numerical value. For measuring the frequency of the fetal heart tone by means of a fetal electrocardiograph, a specialized knowledge of an extremely high level is required in the clinical analysis and extraction of the wave, and moreover, the method of measuring is very much complicated. For accurately auscultating the heart tone magnified with a fetal phonocardiograph, it is necessary for the watcher to keep watch on the shift of the fetal heart tone continuously for a long time.

This invention relates to an alarm type apparatus for watching parturition, which has removed undesirable points in the conventional method and makes it possible to identify the condition of a pregnant woman with ease and speed for every successive stage of the development of parturition. It is characterized in that ECG, heart tone, and heart beat of a fetus, which are converted into electric signals by means of a fetal electrocardiograph, a fetal phonocardiograph, etc., are made to pass between input selectors and indicators such as indicator lamps. Two filters are suitably attached, a first one being designed to prevent the passage of noises arising at the onset of labor pains, and the second being designed to let such noises pass through. A circuit is provided for forming a suitable wave out of the signals from said first filter designed to prevent the passage of noises; and a first relay circuit operates by means of said wave forming circuit and the signals made after the formation of such wave, and through the medium of a tooth wave forming circuit in case the electric potential of the fetal heart tone is high (the frequency of fetal heart beat is low) or without the medium of said tooth wave forming circuit in case said electric potential is low (the frequency of fetal heart beat is high). A wave modulation circuit modulates the signals from said first relay circuit, a second relay circuit is operated by means of the signals that appear from said second filter that allows the passage of said noises; said signals having first been converted to a suitable wave. The structure is so made that the fetal heart tone, electrocardio sounds, and noises arising at the time of onset of labor pains put into said input selector pass through said second filter and such tone, sound and noises within a certain range of frequency are transmitted to said indicator by way of the relay circuit or wave modulating circuit, as the case may be, so as to reveal the condition of the subject.

Embodiments of this invention are given hereunder with explanation in reference to the drawings attached.

Figure 1:
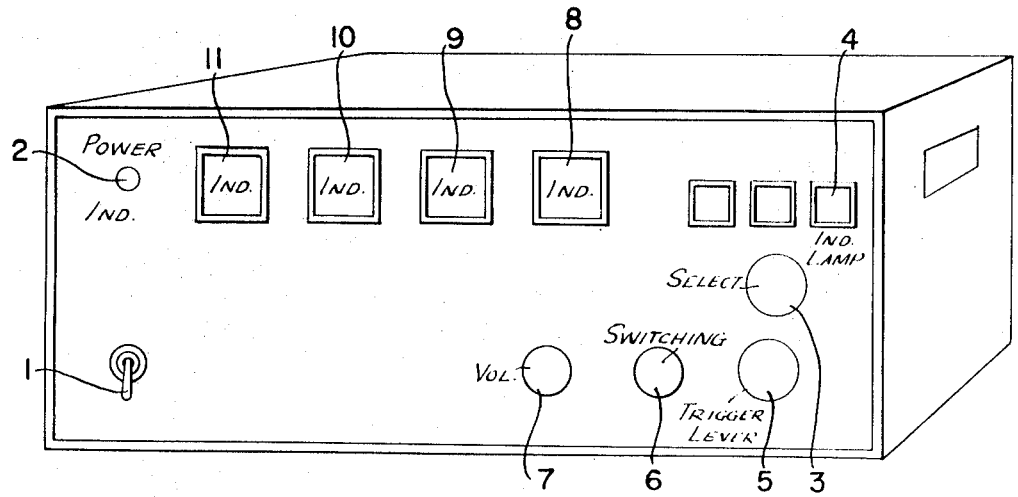
FIG. 1 is a perspective view of the alarm type apparatus for watching parturition.
Figure 2:
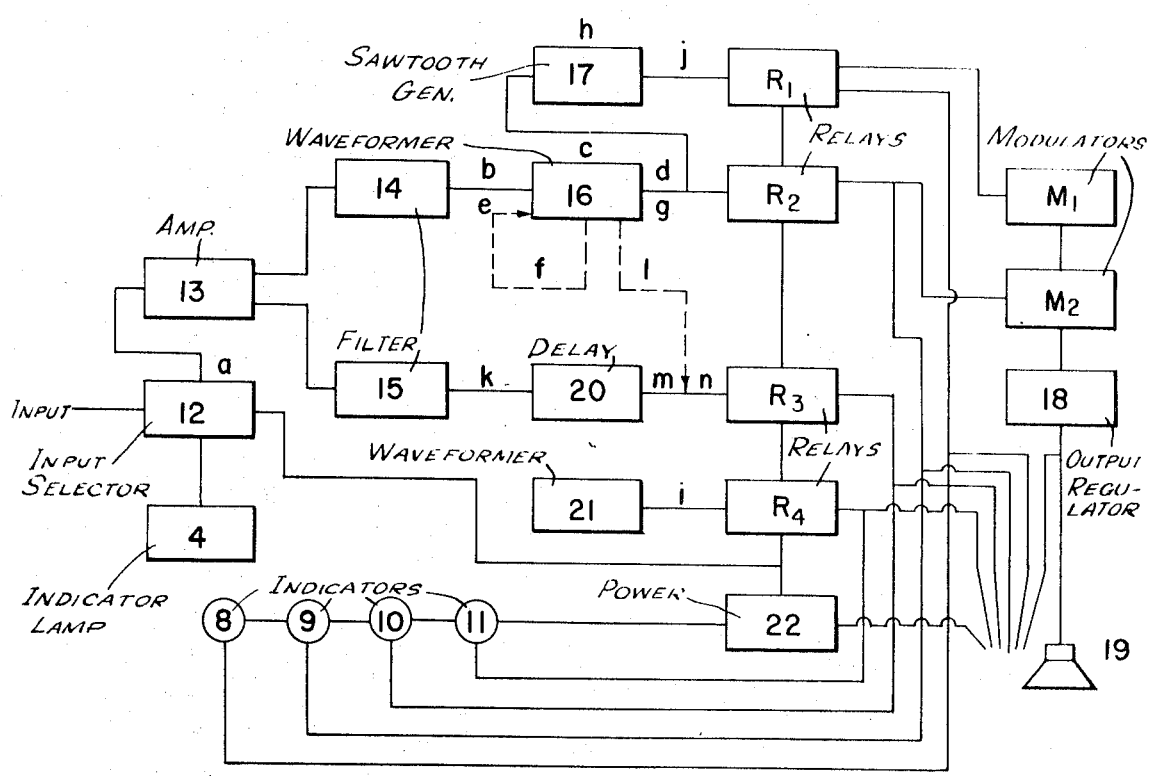
FIG. 2 is a block circuit diagram of the apparatus of this invention.
Figure 3:
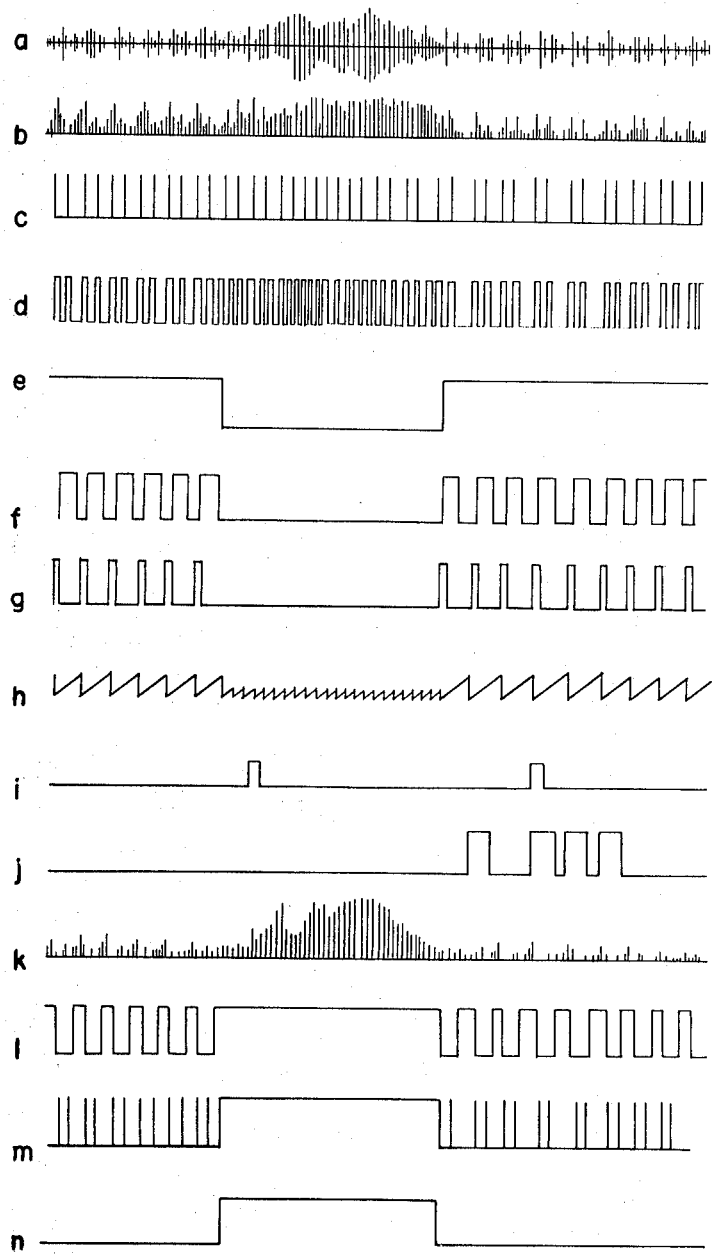
FIG. 3 illustrates the waveforms produced by the circuit of FIG. 2.

Referring now to the drawings, the alarm apparatus of the present invention includes a case having a front panel which mounts a power switch 1, a power indicator lamp 2, a bed selector button 3, an input subject indicator lamp 4, a trigger level regulator button 5, a switching button 6, a modulated volume regulator button 7, and indicator lamps 8, 9, 10 and 11. Inside this case, is mounted an input selector 12 that is operated by means of the switching of said power switch 1, and to said input selector 12 are connected in series output terminals of a fetal phonocardiograph, a fetal electrocardiograph, etc., and at the same time said input selector 12 is connected to an amplifier circuit 13. To said amplifier circuit 13 is connected to a circuit wherein the ratio between signals and noises are taken into account so as to cut the noises that arise at the onset of labor pains. A low region filter 14 functioning to conduct the signals of fetal heart tone, electrocardiograph, etc. is connected to receive the output from the amplifier 13. Also, a high region filter 15 that conducts the noises arising at the onset of labor pains is connected to the amplifier output. To said low region filter 14 are connected successively in series, a wave forming circuit 16, a relay circuit $R_2$ and a wave modulator circuit $M_2$. The wave forming circuit consists of such circuits of Schmitt trigger multivibrator and a switching and delay circuit. To the output of the wave forming circuit 16 are connected in series a toothed wave forming circuit 17, a relay circuit $R_1$, and a wave modulator circuit $M_1$, which, with wave modulator $M_2$ is connected in series to a speaker 19 through a modulated volume output regulator circuit 18. The output of said high region filter 15 is connected to a delay circuit 20 which integrates, presents and delays a semi-fixed potential wave, and a relay circuit $R_3$. The input selector 12 is connected to a relay circuit $R_4$ and to a power circuit 22 which supplies electric power to indicator lamps 8, 9, 10, and 11. Also to said relay circuit $R_4$ is connected a time indicating wave forming circuit 21. The relay circuits $R_1$, $R_2$, $R_3$, $R_4$ are connected in series in that order to the power circuit, and said indicator lamps 11, 10, 9, 8 are connected in series to the power circuit 22. External output terminal lines extend respectively from said relay circuits $R_1$, $R_2$, $R_3$, $R_4$, said power circuit 22 and said modulated volume output regulator circuit 18. Also, said relay circuit $R_1$ is connected to said indicator lamp 8, said relay circuit $R_2$ is connected to said indicator lamp 9, said relay circuit $R_3$ is connected to said indicator lamp 10, and said relay circuit $R_4$ is connected to said indicator lamp 11. The input indicator lamp 4, which indicates the condition of the subject and which can be switched with said bed selector switch 3, is connected to said input selector 12. Wave forms occur in the circuit of FIG. 2 in the manner shown in FIG. 3. The wave (a) from the input selector 12 is changed into a wave (b) by the amplifier circuit 13 and the low region filter 14 and is then transferred into the wave (c) by the Schmitt trigger circuit in the wave forming circuit 16, and said wave is then regulated into the wave (d). The fetal heart tone, which consists of the first heart tone and the second heart tone, is extracted as one single tone in order to prevent the heart beat expression from acting erroneously. In case two waves of nearly the same potential arise from the heart beat of one cycle according to said wave (d), a delay is made for a certain period of time as shown by the wave (f) of the first heart beat in order to negate one of the two waves, and after making a rectangular wave that has a sufficient length of time to negate the second heart beat wave the signals of the first heart beat alone are extracted as shown by the wave (g). By operating the switching circuit in the wave forming circuit 16, the wave (d) is fed to the wave forming circuit 17 which forms the wave (h) and converts this wave into the wave (j) so as to operate the relay circuit $R_1$. As for the wave (k) which passed through the high region filter 15, it passes through the delay circuit 20 where it changes into the wave (m), which is transformed to the wave (n), with the addition of the wave (l) to prevent erroneous operation. The wave (i) is the pulse for indicating the time when the heart beat is measured and is provided by the wave forming circuit 21.

After introducing the output signals from the fetal electrocardiograph or the fetal phonocardiograph into the input seelctor 12 and confirming the identity of the subject to be examined with the input subject indicator lamp 4, the signal (wave (a)) discharged from the said selector is suitably amplified by means of the amplifier circuit 13. The signal amplified through said amplifier circuit 13 is fed to filter 14 which eliminates the noises arising at the onset of labor pains and is transmitted to the wave forming circuit 16, where the signal (wave (b)) takes the wave (d) or (g). In the wave forming circuit 16, the signal is separated by means of the electric potential of the fetal heart tone. In case the electric potential of the fetal heart tone is low, the signal (wave (g)) directly operates the relay circuit $R_2$ and indicates the number of tones on the speaker 19 through the medium of the wave modulator circuit $M_2$ and the modulated volume output regulator circuit 18, and at the same time causes the indicator lamp 9 to light up. When the fetal tone electric potential is high, the switching circuit in the wave forming circuit 16 is operated to transmit the signal (wave (d)) to the toothed wave forming circuit 17 so as to change it into the wave (h), and further into the wave (j), which in turn operates the relay circuit $R_1$ to activate the speaker alarm through the medium of the wave modulator circuits $M_1$, $M_2$ and the modulated volume output regulator circuit 18, and at the same time making the indicator lamp 8 light up. Meanwhile, the signal amplified through the amplifier circuit 13 is transmitted to the high region filter 15 that lets pass the noises that arise at the onset of labor pains. This signal (wave (k)) runs through the delay circuit 20 and forms the signal having the wave (m). In order to prevent this signal (wave (m)) from operating erroneously, the signal (wave (l)) is added thereto to change it to the signal (wave (n)), so that the relay circuit $R_3$ is operated to make the indicator lamp 10 light up. In the event that the heart beat is measured, the signal (wave (i)) discharged from the time indicating wave forming circuit 21 operates the relay circuit $R_4$, etc., so as to switch on and off the indicator lamp every five seconds as in the clinical case, thus making it possible to obtain the chronological value of the heart beat measurement.

In the apparatus of this invention the indicator lamp attached outside will suitably indicate the successive condition of the subject and the speaker 19 also will keep the watcher informed of such condition. Thus, the physiological condition of the subject can be perceived through the lighting of the indicator lamp 9, while the speaker 19 permits the auditory recognition of the heart beat frequency. In case the subject falls into a dangerous condition, the indicator lamp 9 is switched off in favor of the indicator lamp 8, and at the same time the alarm sound is discharged from the speaker to show that the subject is in a danger zone (abnormal zone). As soon as the dangerous condition disappears, the indicator lamp 8 is switched off in favor of the indicator lamp 9, which shows that the subject has returned to the normal condition. As for the aspect of the onset of labor pains, the information can be obtained from the lighting of the indicator lamp 10, which is switched off when labor pain has subsided. Intervals between successive labor pains can also be perceived by the switching on and off of this indicator lamp 10. As external output terminal lines are attached to each of the relay circuits $R_1$, $R_2$, $R_3$, $R_4$, power circuit 22, and modulated volume output regulator circuit 18, the check and analysis of waves can be at a given time.

In addition, it is also possible to provide this apparatus with such auxiliary devices as a recorder and an interphone for giving instructions for the control (watching the heart beat) of the subject after operation.

From the above explanation it can be understood that the apparatus of this invention has the following characteristics.

(i) Anybody can watch and understand the condition of the fetal beat with ease and precision.

(ii) The presentation of the heart beat frequency is made with sound and lamps either in the normal zone or in the abnormal zone; so anybody can read the apparatus, even though he may not be a physician or a midwife.

(iii) In the event of abnormal frequency of heart beat, anybody can notice such abnormality immediately through the alarm sound and the lamp indication.

(iv) Intervals between labor pains can be detected with ease and precision.

(v) Information on the heart beat and labor pains can be obtained without delay by means of the sound expression (5-minute interval). In other words, whereas the conventional apparatus for watching parturition has involved the use of technical knowledge, specialized training and too much time in the processing, reading and analysis of data, this apparatus makes it possible to follow each stage of the parturition in its varying phases, so that a proper measure can be taken to meet the situation at each stage.

(vi) A disc-monitor (containing an indicator that synchronizes with the indicator of this apparatus) makes it possible to keep watch from a remote place for a long time (the entire process of parturition).

(vii) The whole apparatus is small and inexpensive.

What is claimed is:

1. A method for indicating the condition of pregnant women and unborn children during each successive stage of parturition which includes converting a fetal heart tone and heart beat into electric signals having a frequency and amplitude indicative thereof, separating from said electric signals a first signal substantially devoid of noise signals occurring at the onset of labor pains, sensing the electric potential of said first signal to determine whether such potential is above or below a desired level, employing said first signal to operate a first normal condition indicator means when said electric potential is below said level and to operate a second abnormal condition indicator means when said electric potential is above said level, separating noise signals occurring in said electric signals at the onset of labor pains from said electric signals, and employing said noise signals to operate a third labor pain indicator means.

2. The method of claim 1 which includes converting said noise signals and first signal to visual and audio indications having a frequency related to the frequency of said noise and first signals.

3. An alarm type apparatus for indicating the condition of pregnant women and unborn children during each successive stage of parturition which includes sensing means for converting a fetal heart tone and heart beat into electric signals having an amplitude and frequency indicative thereof, first filter means connected to receive said electric signals and to provide a filter output signal substantially devoid of noise signals occurring at the onset of labor pains, wave forming means connected to receive said filter output signal, said wave forming means operating to provide a first output signal when the electric potential of said filter output signal is above a desired potential and a second output signal when said filter output signal is below a desired potential, abnormal condition indicator means connected for activation by said first output signal, normal condition indicator means connected for activation by said second output signal, second filter means connected to receive said electric signal and to pass said noise signals occurring at the onset of labor pains, and labor pain indicator means connected for activation by said noise signals.

4. The alarm apparatus of claim 3 wherein said wave forming means includes sawtooth generator means connected to provide a sawtooth signal in accordance with the electric potential of said filter output signal when said filter output signal is above said desired potential, first relay means connected to receive said sawtooth signal, and to provide an output frequency signal related thereto, an audio indicator and a first indicator lamp forming said abnormal condition indicator means and connected to receive the output frequency signal from said first relay means, second relay means connected to receive said second output signal and to produce an output frequency signal related thereto, said audio indicator and a second indicator lamp forming said normal condition indicator means and connected to receive the output frequency signal from said second relay means, and third relay means connected to receive said noise signals and to produce an output frequency signal related thereto, said labor pain indicator means including a third indicator lamp connected to receive the output frequency signal from said third relay means.

5. The alarm apparatus of claim 4 which includes a timing signal generating means for providing a timing signal, fourth relay means connected to provide an output frequency signal in response to said timing signal, and an indicator lamp connected to receive said output frequency signal from said fourth relay means.

6. The alarm apparatus of claim 4 wherein said audio indicator includes first modulator means connected to said first relay means, second modulator means connected to said second relay means and speaker means connected to receive signals from said first and second modulator means.

7. The alarm apparatus of claim 4 wherein time delay means is connected between said second filter means and said third relay means to delay said noise signal.

References Cited

UNITED STATES PATENTS

| 2,536,527 | 1/1951 | Appel | 128—2.05 |
| 3,120,227 | 2/1964 | Hunter Jr. et al. | 128—2.06 |
| 3,318,303 | 5/1967 | Hammacher | 128—2.05 |
| 3,348,535 | 10/1968 | Gregg | 128—2.05 |
| 3,409,737 | 11/1968 | Settler et al. | 128—2.06 X |
| 3,267,934 | 8/1966 | Thornton | 128—2.06 A |

WILLIAM E. KAMM, Primary Examiner

U.S. Cl. X.R.

128—2.06 F